Feb. 8, 1927.
H. D. YODER
EJECTOR MECHANISM
Filed Aug. 27, 1923
1,617,093
2 Sheets-Sheet 1

Inventor
Howard D. Yoder

By Whittemore Hulbert Whittemore
+Belknap  Attorneys

Feb. 8, 1927.
H. D. YODER
1,617,093
EJECTOR MECHANISM
Filed Aug. 27, 1923    2 Sheets-Sheet 2
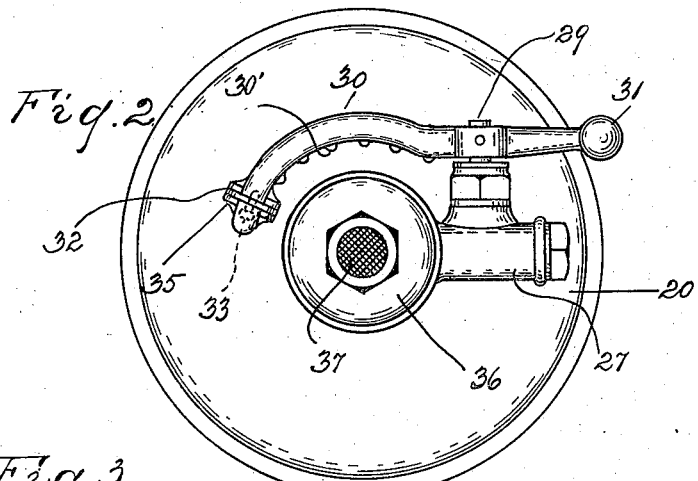
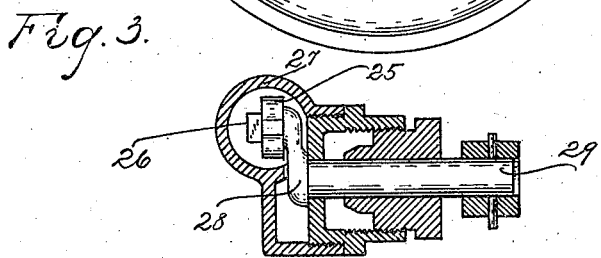
Inventor
Howard D. Yoder
By Whittemore Hulbert Whittemore
 +Belknap    Attorneys Patented Feb. 8, 1927.

1,617,093

UNITED STATES PATENT OFFICE.

HOWARD D. YODER, OF DETROIT, MICHIGAN, ASSIGNOR TO PENBERTHY INJECTOR COMPANY, OF DETROIT, MICHIGAN, A CORPORATION OF MICHIGAN.

EJECTOR MECHANISM.

Application filed August 27, 1923. Serial No. 659,692.

The invention relates to ejector mechanisms and more particularly to ejector mechanisms designed for use in the discharging of water from sumps in cellars.

These ejector mechanisms depend for their operation upon the flow of water under pressure through the ejector and since the pressure of the water in the supply pipes to which the ejector mechanisms are connected varies in different localities, the operation of the ejector mechanisms heretofore employed has varied. With my invention the ejector mechanism adjustment may be varied to suit the local water pressure without varying the operation.

Another object is the provision of an ejector mechanism in which fluttering of the water inlet control valve is prevented. A further object is the provision of a sieve permanently secured in its housing whereby inverting of the sieve in its housing and consequent passage through the ejector mechanism of the sediment collected by the sieve is prevented.

With these and other objects in view, the invention resides in the novel features of construction and combinations and arrangements of parts as more fully hereinafter set forth.

In the drawings:

Figure 2 is a top plan view thereof;

Figure 3 is a cross section on the line 3—3 of Figure 1.

Figure 1:
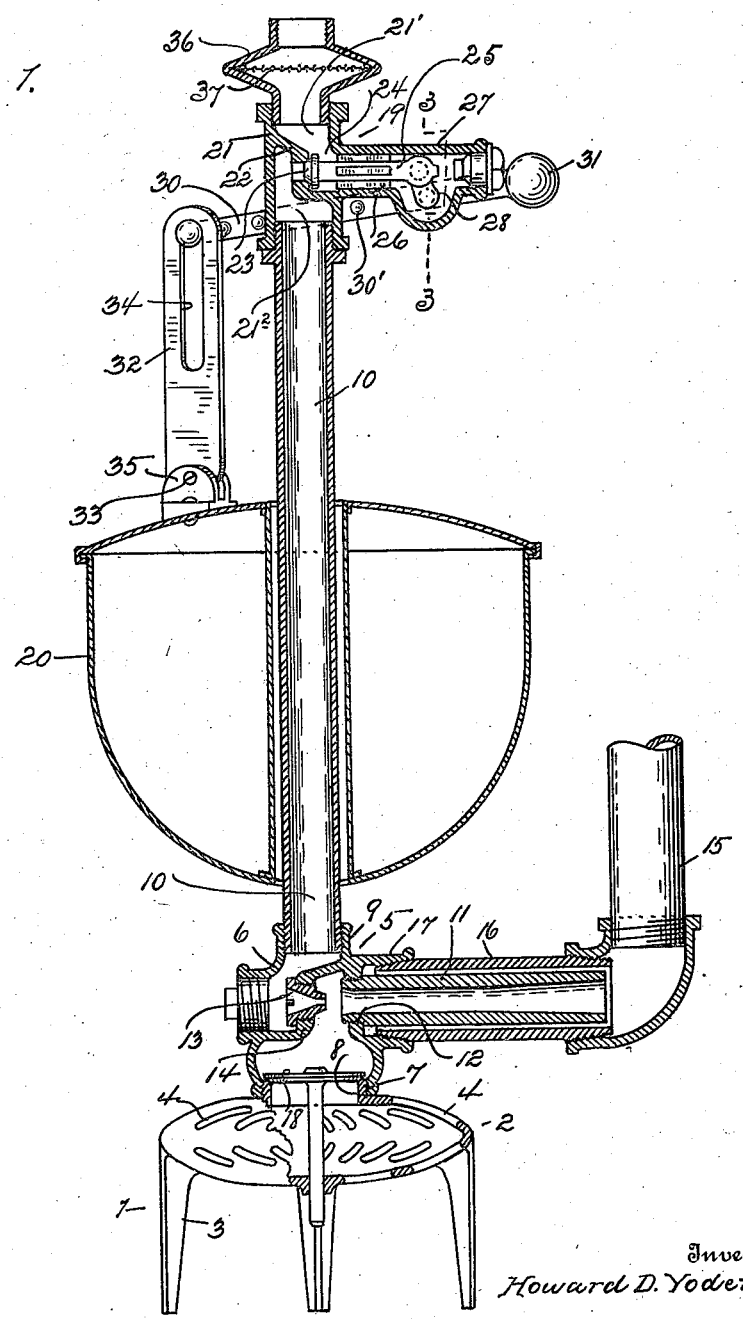
Figure 1 is a vertical central section partly in elevation through an ejector mechanism embodying my invention.

1 is the base of the ejector mechanism having the hollow chamber 2 mounted upon the legs 3 and provided with the sump water inlet openings 4. 5 is the ejector having the fitting 6 provided with the internally threaded nipple 7 for coupling with the externally threaded nipple 8 upon the hollow body 4. The fitting is also provided with the axially aligned internally threaded nipple 9 for coupling with the water inlet pipe 10. 11 is the Venturi tube preferably formed of a separate member having an externally threaded nipple 12 for coupling with the fitting 6, in axial alignment with the nozzle 13 threadedly secured to the partition wall 14 of the fitting. 15 is the water outlet pipe communicating with the discharge end of the Venturi tube and mounted upon the pipe 16 which surrounds the Venturi tube and is coupled to the internally threaded nipple 17 of the fitting.

As thus far described, water under pressure upon passing through the nozzle 13 and the Venturi tube 11 entrains water in the sump, in which the ejector mechanism is located, and ejects the same through the Venturi tube and the water outlet pipe 15. To prevent the sump water from returning into the hollow body 4 upon stopping of the inlet water there is the control valve 18 which automatically seats upon the nipple 8 of the hollow body.

19 is the valve mechanism mounted upon the upper end of the water inlet pipe 10 for controlling the flow of inlet water through this pipe and the ejector 5, this valve mechanism being adapted to be coupled to a supply pipe containing water under pressure. 20 is a float slidably sleeved upon and guided by the water inlet pipe 10 and actuated by the water in the sump, this float controlling the operation of the valve mechanism.

21 is the fitting of the valve mechanism having the water inlet and outlet passageways 21' and 21² respectively separated by the ported partition 22. 23 is the valve adapted to seat upon the partition and close the port therein. To prevent fluttering or rapid opening and closing of the valve, the latter is of the poppet type and so arranged that in either its closed or its open position the pressures upon its opposite sides are unbalanced, thereby tending to hold the same in its adjusted position. As shown, the valve moves to closed position in the direction taken by the inlet water flowing through the fitting 21, so that when closed the inlet water exerts a pressure upon its rear face tending to hold the valve closed. The valve when moved to open position occupies the recess 24 in the wall of the fitting 21, and as a consequence the pressure of the inlet water exerted upon the valve at this time tends to hold the valve open. Therefore, with this arrangement, the float 20 must exert greater force to move the valve from either its closed or open positions and consequently greater extremes of high and low levels of the sump water are secured than if the valve were balanced.

The valve is provided with the stem 25 having the guiding portions 26 adapted to contact with the walls of the lateral hollow projection 27 of the fitting 21. The rear end of this valve is pivotally connected to the rock arm 28 upon the rock shaft 29 extending transversely horizontally through a wall of the hollow projection 27. The outer end of this rock shaft has secured thereto the lever 30 which has at one side of the rock shaft the counter-balancing weight 31 and is connected at the other side of the rock shaft to the link 32, the lower end of the latter being pivotally connected to the top of the float 20 by the screw 33. The link 32 has the longitudinally extending elongated opening 34 through which the lever 30 extends, the upper end of this opening rotating the lever to close the valve and the lower end rotating the lever to open the valve.

Since the pressure of water in supply pipes to which my ejector mechanism is adapted to be coupled, varies in different localities, and since the pressure of the inlet water affects the operation of the ejector mechanism by varying the resistance offered to opening and closing the valve, I have provided means for taking care of this variation in water pressures. This is accomplished by varying the leverage exerted by the float 20 upon the lever 30. As shown the portion of the lever 30 which is engaged by the link 32 is curved and made concentric with the water inlet pipe 10 and this curved portion of the lever is provided with the spaced projections 30'. The width of the elongated opening 34 of the link is slightly greater than the diameter of the curved portion of the lever 30, and as a consequence, when the link 32 is in operative position, its movement along the curved portion of the lever is limited by the projections 30'. To change the position of the upper end of the link relative to the curved portion of the lever, the lower end of the link is disconnected from the float 20 by removing the screw 33, after which the lower end is swung upwardly so that the normally upper end of its elongated opening can pass over the projections 30' and then moved longitudinally of the curved portion to the desired point, after which the normally lower end of the link is swung downwardly and the float 20 is rotated about the water inlet pipe 10 until the lower end of the link can be inserted between the ears 35 upon the top of the float, after which the screw 33 is inserted. By reason of having the float 20 rotatable about the water inlet pipe and forming the lever 30 with a link engaging portion concentric with the water inlet pipe, the position of the upper end of the link 32 relative to the curved portion may be readily varied to take care of the difference in pressure of the water in the supply pipe to which my ejector mechanism is coupled.

To collect sediment in the water entering my ejector mechanism, I have provided the one-piece housing 36 having an externally threaded nipple adapted to be coupled to the inlet end of the fitting 21 and an internally threaded nipple adapted to be coupled to the water supply pipe. This housing is provided with the transverse sieve 37 which is permanently secured therein. If it is desired to remove the sediment collected by the sieve, the sieve cannot be inverted in the housing, or the housing cannot be inverted, thereby allowing the sediment to pass through the ejector mechanism, but the housing must be removed and then the sediment can be removed by flowing water through the housing in the opposite direction from that taken by the water in passing through the housing when coupled to the ejector mechanism.

From the above description, it will be readily seen that I have provided an ejector mechanism which may be readily adjusted to take care of different pressures of water in pipes to which my ejector mechanism is adapted to be coupled so that substantially the same operation of ejector mechanism is possible in each instance. It will also be seen that I have provided a water inlet valve control mechanism in which the inlet water exerts a pressure upon one side only of the control valve when in either open or closed position so that fluttering of the valve is prevented. Also, the arrangement of valve and mechanism between the valve and float is very simple and offers but slight resistance to the movement of the valve. Furthermore, it will be seen that I have made a simple provision for collecting sediment in the inlet water which prevents inverting the sieve in its housing to remove the sediment therefrom.

What I claim as my invention is:

1. In an ejector mechanism, the combination with a water inlet pipe, of a valve for controlling the flow of water therethrough, a pivoted lever for actuating said valve, a float for actuating said lever, a link between said float and lever, said link when disconnected from said float being adjustable longitudinally of said lever and said link being normally non-adjustable when secured to said float.

2. In an ejector mechanism, the combination with a water inlet pipe, of a valve for controlling the flow of water therethrough, a pivoted lever for actuating said valve, a float for actuating said lever, a link between said float and lever, and means for preventing longitudinal adjustment of said link on said lever when said link is connected to said float, said means permitting said adjustment when said link is disconnected therefrom.

3. In an ejector mechanism, the combination with a water inlet pipe, of a valve for controlling the flow of water therethrough, a float guided by said water inlet pipe, a pivoted lever for actuating said valve provided with a portion substantially concentric with said water inlet pipe, and a connection between said float and substantially concentric portion of said lever adjustably connected thereto longitudinally thereof.

4. In an ejector mechanism, the combination with a water inlet pipe, of a valve mechanism coupled thereto and including a fitting, and a valve within said fitting for controlling the flow of water to said water inlet pipe, a float guided by said water inlet pipe, a lever pivotally mounted upon said fitting for actuating said valve provided with a portion substantially concentric with said water inlet pipe, shoulders upon said substantially concentric portion of said lever, and a link connected to said float and lever alternatively engageable with said shoulders.

5. In an ejector mechanism, the combination with a water inlet pipe, of a valve mechanism coupled to said water inlet pipe including a fitting and a valve therewithin for controlling the flow of water into said water inlet pipe, a lever pivoted upon said fitting for actuating said valve, said lever having a portion substantially concentric with said water inlet pipe and provided with projections upon its inner side, a float sleeved upon said water inlet pipe and guided thereby, and a link connected to said float and lever for actuating the latter from the former, said link having a longitudinally extending elongated opening through which the substantially concentric portion of said lever extends.

6. In an ejector mechanism, the combination with a water inlet pipe, of a valve for controlling the flow of water therethrough, a float guided by said water inlet pipe, a pivoted lever for actuating said valve, a connection between said float and said lever, and means operable by the rotative adjustment of said float for changing the effective leverage of said float on said valve.

7. In an ejector mechanism, the combination with a water inlet pipe, of a valve for controlling the flow of water therethrough, a pivoted lever connected to said float and to said valve, and means for varying the leverage of said float on said valve, said means being adjustable only when said float is disconnected from said valve.

8. In an ejector mechanism, the combination with a water inlet pipe, of a valve controlling the flow of water therethrough, a pivoted lever for actuating said valve, a float, a link forming a connection between said float and lever, and a series of fixed stops on said lever adapted to retain said link in various positions of adjustment whereby the leverage may be adjusted to correspond with different water pressure.

9. In an ejector mechanism, the combination with a water inlet pipe, of a valve for controlling the flow of water therethrough, a float guided by said water inlet pipe, a pivoted lever for actuating said valve provided with a portion substantially concentric with said water inlet pipe, a plurality of bearing surfaces upon the substantially concentric portion of said lever, and a link connected to said float and lever, selectively engageable with said bearing surfaces.

10. In an ejector mechanism, the combination with a water inlet pipe, of a valve fitting coupled to said water inlet pipe, a valve within said fitting for controlling the flow of water therethrough, a rotatable float below said fitting in axial alignment therewith, a link detachably secured to said float, and a lever for actuating the valve, the said lever being connected respectively to the valve and to the link, the connection between the lever and the link being adjustable whereby rotation of the float varies the leverage exerted by the float upon the lever.

11. In an ejector mechanism, the combination with a water inlet pipe, of a valve for controlling the flow of water therethrough, means including a rotatably mounted float for actuating the valve and a connection between said means and said valve whereby rotation of the said means varies the effective leverage of the float on the valve.

12. In an ejector mechanism, the combination with a water inlet pipe, of a valve for controlling the flow of water therethrough, means including a rotatably mounted float for actuating the valve, a connection between said means and said valve whereby rotation of the said means varies the effective leverage of the float on the valve, and means normally preventing rotative adjustment of the said first mentioned means.

13. In an ejector mechanism, the combination with a water inlet pipe, of a valve controlling the flow of water therethrough, a lever for actuating the valve, a float, and a link connecting the float and the lever, the said link being adjustable in a path around the water inlet pipe for changing the effective leverage of the float on the valve.

14. In an ejector mechanism, the combination with a water inlet pipe, of a valve for controlling the flow of water therethrough, a lever for actuating the valve, a float, a link connecting the float and the lever, the said link being adjustable in a path around the water inlet pipe for changing the effective leverage of the float on the valve, and means carried by the lever normally preventing adjustment of the said link.

15. In an ejector mechanism, the combination with a water inlet pipe, of a valve for controlling the flow of water therethrough, a float guided by said water inlet pipe for actuating the valve, and means for varying the effective leverage of the float on the valve.

In testimony whereof I affix my signature.

HOWARD D. YODER.